United States Patent [19]
Davis et al.

[11] 3,915,782
[45] Oct. 28, 1975

[54] METHOD OF ATTACHING HAND GRIPS TO FIBERGLASS TOOL HANDLES

[75] Inventors: Elbert Davis, Glendale; John L. White, Sunland, both of Calif.

[73] Assignee: Nupla Corporation, Sun Valley, Calif.

[22] Filed: Mar. 4, 1974

[21] Appl. No.: 448,075

Related U.S. Application Data

[63] Continuation-in-part of Ser. No. 340,231, March 12, 1973, abandoned.

[52] U.S. Cl. ............. 156/294; 16/110 R; 16/116 R; 156/310; 156/322; 156/330; 156/335; 156/332; 273/81 R
[51] Int. Cl.² ......................................... B32B 31/12
[58] Field of Search ............ 156/293, 330, 335, 294, 156/310, 322, 332; 16/110 R, 116 R; 273/80 R, 81 R, DIG. 7

[56] References Cited
UNITED STATES PATENTS

| | | | |
|---|---|---|---|
| 3,344,684 | 10/1967 | Steere et al. ...................... | 273/81 R |
| 3,396,064 | 8/1968 | Hoffmann ........................... | 156/335 |
| 3,578,825 | 5/1971 | Merrow .............................. | 306/32 |
| 3,600,247 | 8/1971 | Armstrong ......................... | 156/335 |
| 3,723,223 | 3/1973 | LeCompte .......................... | 156/330 |
| 3,737,355 | 6/1973 | Epstein et al. .................... | 156/293 |

FOREIGN PATENTS OR APPLICATIONS
1,207,840  10/1970  United Kingdom ............ 273/DIG. 7

*Primary Examiner*—Daniel J. Fritsch
*Attorney, Agent, or Firm*—Robert C. Comstock

[57] ABSTRACT

A method of attaching hand grips of polyvinyl chloride or other plastic to fiberglass tool handles. The hand grip receiving portion of the handle is coated with a primer solution containing both thermosetting and thermoplastic ingredients. It is first heated to partially cure the thermosetting ingredient and thereby form a bond with the handle. Before the handle and grip are assembled, the inner surface of the grip is activated with a solvent. The coated handle portion is then heated further and inserted into the hand grip to cause the thermoplastic ingredient on the handle to form a bond with the solvent activated thermoplastic material on the inside of the hand grip.

10 Claims, 4 Drawing Figures

U.S. Patent    Oct. 28, 1975    3,915,782
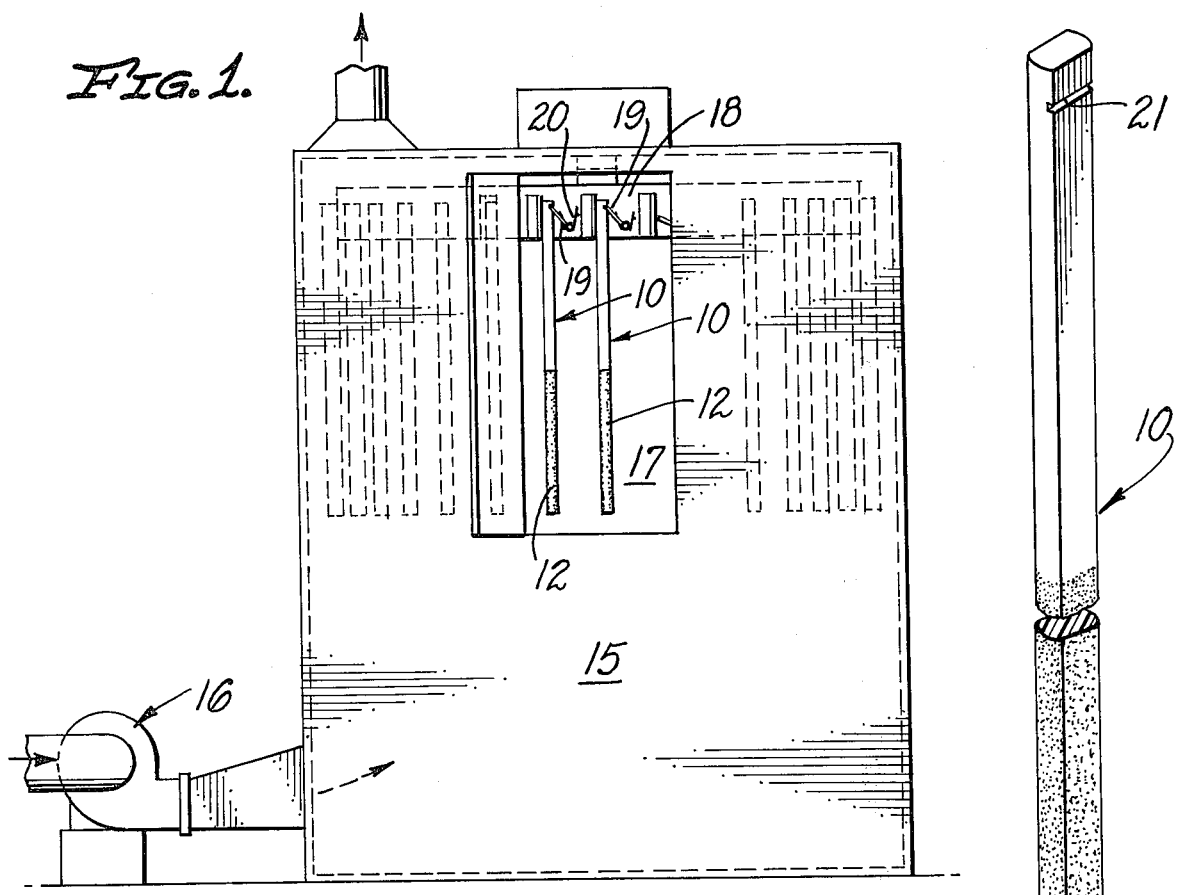
FIG. 1.
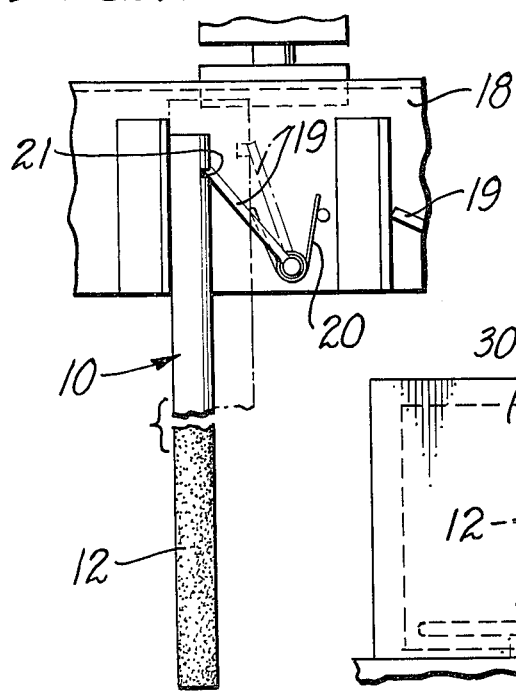
FIG. 2.
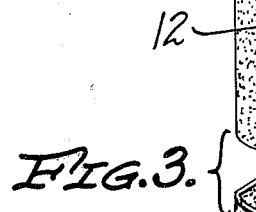
FIG. 3.
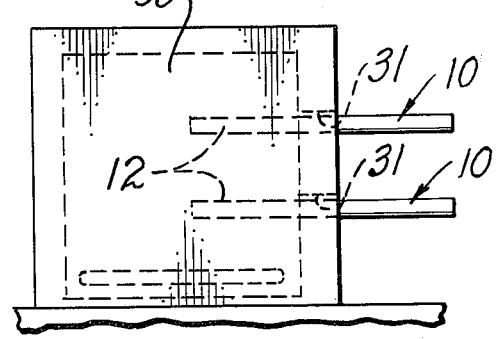
FIG. 4.
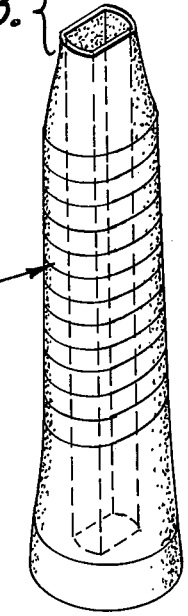

METHOD OF ATTACHING HAND GRIPS TO FIBERGLASS TOOL HANDLES

REFERENCE TO RELATED APPLICATION

This application is a continuation-in-part of application Ser. No. 340,231 filed Mar. 12, 1973, now abandoned.

BACKGROUND OF THE INVENTION

1. Field of the Invention

The invention relates to a method of attaching plastic hand grips to fiberglass tool handles.

2. Description of the Prior Art

At the present time, most hand grips for tools are formed of rubber, which may easily be adhered to a tool handle, regardless of the type of material from which the handle is formed.

The most desirable combination of materials, however, is a handle formed of fiberglass and a hand grip formed of a thermoplastic elastomer which materials have superior mechanical, electrical, weathering, aging and color properties as compared to rubber. These two materials cannot be bonded to each other with the adhesives and attaching techniques which are conventionally used for hand grips formed of rubber because an adequate and safe bond will not form between them.

It is possible to mold the hand grip around the handle, but this is economically unfeasible because insertion and removal of the handles into and from the molds results in very slow production time with resultant high cost of manufacturing.

SUMMARY OF THE INVENTION

The primary object of the present invention is to provide a method of attaching plastic hand grips to fiberglass shafts to make a handle in which previously molded hand grips can be satisfactorily bonded to previously formed fiberglass components. The invention accordingly permits the independent production of both handles and hand grips at as rapid a production rate as possible without either interfering with the production of the other.

Another object of the invention is to provide a method of attaching plastic hand grips to fiberglass components which is economically feasible and which provides for the production of finished products at as low a production cost as possible.

In essence, the invention contemplates applying to the hand grip receiving part of the fiberglass handle a primer solution containing both thermoplastic and thermosetting ingredients. The coated handle shaft is then heated sufficiently to partially cure the thermosetting ingredient of the primer solution so that a bond is formed with the fiberglass handle and so that a degree of solvent resistance is developed in the primer coating. The handle receiving portion of the hand grip is coated with a solvent to make it more thermoplastic. The handle is further heated and inserted into the hand grip. The heat from the handle causes a bond to be formed between the thermoplastic ingredient of the primer solution and the solvent activated thermoplastic material of the hand grip.

It is accordingly among the objects of the invention to provide a method of attaching plastic hand grips to fiberglass handles which solves in a simple, expedient and efficient manner the problem of forming a bond between two normally incompatible and unbondable materials.

The invention also comprises such other objects, advantages and capabilities as will later more fully appear and which are inherently possessed by the invention.

While we have shown in the accompanying drawings and described in the following specification preferred embodiments of the invention, it should be understood that the same are susceptible of modification and change without departing from the spirit of the invention.

DESCRIPTION OF THE DRAWINGS

FIG. 1 is a side elevational view of a heating device for heating tool handles;

FIG. 2 is an enlarged detailed view of the holding means used in the heating device for gripping and suspending the tool handles;

FIG. 3 is an exploded isometric view of the tool handle (partly broken away) and hand grip prior to assembly;

FIG. 4 is a side elevational view of the second oven with a pair of handles mounted therein.

DESCRIPTION OF THE PREFERRED EMBODIMENT

A preferred embodiment which has been selected to illustrate our invention comprises an elongated fiberglass tool handle and a hollow hand grip, which is preferably molded of some what resilient material having thermoplastic properties. Preferable materials would include any thermoplastic polymer. Polyvinyl chloride has been found to be particularly satisfactory.

The first step in the assembly process is to coat the lower part 12 of the handle 10, comprising the portion which is adapted to fit within the interior of the hand grip 11, with a relatively low viscosity primer solution.

The primer solution contains a soluble thermoplastic material such as an acrylic resin of the methacrylate series or possibly other suitable plastic materials such as polyvinyl chloride. The primer solution also contains a soluble thermosetting polymer such as phenol formaldehyde resin or urea formaldehyde resin or other suitable thermosetting material. These two ingredients are combined with a solvent of the appropriate type known to those skilled in the art and which is suitable to carry both materials into a compatible solution.

The proportions of thermoplastic and thermosetting ingredients used will necessarily vary, depending in part on the particular solvent and temperatures used. If too much thermosetting material is used, the lower part 12 of the handle 10 will bond with a substantially inert film which withstands heat and solvent and which will not form a bond with the thermoplastic grip material. If too much thermoplastic material is used, the resulting film will be too sensitive to heat and solvent will be dissolved off the surface of the handle upon subsequent heating and/or contact with solvent.

An example of a primer solution which has proved to be satisfactory in use is as follows:

| | |
|---|---|
| Acryloid A-21 (30%) acrylic ester resin solution in 90/10 toluol/ butanol from Rohm & Haas Company | 20 lbs. |
| BKS-2600 (54%) unmodified phenolic resin solution in denatured alcohol from Union Carbide Corp. | 13 oz. |
| Dow Corning Z-6040 silane (epoxy | |

-Continued

| | |
|---|---|
| functional glycidoxy-propyl trimethoxy silane) from Dow Corning Corp. | 4 oz. |
| Methyl isobutyl ketone solvent | 8 lbs. 8 oz. |
| Methyl alcohol solvent | 12 lbs. 12 oz. |

In the above formula, the Acryloid acrylic resin is the thermoplastic ingredient. The BKS phenolic resin is the thermosetting ingredient. The silane improves the specific adhesion to the fiberglass handle. The ketone and alcohol solvents make the two resins compatible and mutually soluble.

The Acryloid A-21 in the above formula is an acrylic ester resin having excellent properties of adhesion and hardness. It air dries rapidly to give a clear film. It is a relatively hard polymer, so that plasticizer is required. The material is compatible with a wide range of monomeric plasticizers.

The BKS-2600 is one of the fastest curing resin baking solutions and requires only a relatively low temperature and short time for its polymerization.

The silane has an organic portion or residue as a sidechain which is compatible with acrylic and phenolic resins, both of which are organic carbon compounds. It has a silicon-oxygen backbone which has high affinity for the silicon-oxygen of the fiberglass shaft. The fiberglass accordingly forms a bond with one part of the silane, while the resins bond with the other part.

The acrylic and phenolic resins have different solubility and are customarily in different solvents. One normally tends to precipitate the other, so they are usually not mutually compatible within the same solution. It is necessary to utilize solvents which will prevent either resin from precipitating out of the solution. The solvents should also be fast evaporating solvents for the particular use intended.

While experiments have not been conducted to determine the upper and lower limits of quantities or proportions of the various ingredients contained in the above formulation, it is believed that the proportion of solids which is set forth as approximately 15 percent of the total may be lowered to the range of approximately 5 percent of the total or increased to the range of approximately 25 percent of the total.

The proportions of one resin with respect to the other may be varied as long as the undesirable results set forth above are avoided if an excessive amount of either resin is used. The quantities and types of solvents used may be varied within the skill of the art.

It should be noted that what is critical to the successful practice of the invention is (1) the use of sufficient cross-linking thermosetting ingredient to develop resistance to the heat of the assembly operation as well as resistance to the activating solvent used during assembly, and (2) the use of sufficient thermoplastic ingredient to make heat sealing possible and to make the interface susceptible to some, but not excessive, solvent attack.

The balance of these two effects is obtained through choice of the specific type of thermoplastic and thermosetting resins as well as adjustment of the proportions of the two.

After the primer solution has been applied to the lower part 12 of the handle 10, the handle is then heated sufficiently to dry the solvent and cause the thermosetting resin to be partially, but not completely, cured. It should be cured only to the extent necessary for it to form a bond with the surface of the fiberglass handle, but not to the extent which would interfere with the bond forming properties of the thermoplastic ingredient. If the thermosetting resin were completely cured it would take a firm heat resistant and solvent resistant set and would resist and actually prevent the formation of a subsequent bond between the handle and hand grip. A recommended heating temperature which has been found to be satisfactory for partially curing the thermosetting resin is about 200° – 250°F. for a few minutes.

Any suitable means may be used for heating the handles. One expedient which has been found to be satisfactory is illustrated in FIGS. 1 and 2 of the drawings. An oven 15 is provided with heat from a suitable source of heat supply 16. The oven 15 is completely enclosed except for a window 17 through which handles are inserted and removed.

A circular ring 18 is rotatably mounted adjacent to the top of the oven. The ring 18 carries a plurality of spring clips, which are best shown in FIG. 2 of the drawings. Each spring clip comprises a flat leaflike holding flap 19 which is urged in a diagonal outward direction by a spring 20. The lower end of the flap 19 is pivotally mounted and the free upper end is adapted to removably fit into a notch 21 formed adjacent to the end of the handle 10. As shown in FIG. 2, the handle holding spring clips will automatically adjust to receive substantially any size of handle. A small size handle is shown in solid lines and a larger size in phantom lines.

While the handle part 12 is being coated with primer and the primer partially cured, the inside or handle receiving portion of the hand grip 11 is coated with a relatively low viscosity solvent of a suitable type by spraying, brushing, slushing or other appropriate technique.

Since the hand grip 11 is formed of a thermoplastic elastomer it can be made more bondable by the application of a suitable solvent which penetrates its surface and renders it more suitable for forming a bond. The solvent activates the inner wall surfaces to bond at a lower heat sealing temperature. A suitable solvent which has been found to be satisfactory is tetrahydrofuran, although other suitable solvents may be used. Heating the inner walls of the hand grip to render them more thermoplastic is not feasible, so a solvent is used which performs substantially the same function.

Immediately prior to assembly, the primer coated part 12 of the handle 10 is brought rapidly to a surface temperature preferably in the range of 300° – 350°F. This can be done in a second oven 30 in which one side wall has a plurality of handle receiving openings 31. Preferably only the coated lower part 12 of the handle 10 is inserted into the oven 30 through openings 31. The remaining protruding part of the handle 10 has customarily been painted for appearance purposes. The paint should not be subject to excessive heat and it also provides insulation which makes it easier to grip the handles after the second heating.

The handle part 12 is then inserted into the hand grip 11. The heat applied to the handle part 12 causes the thermoplastic ingredient of the primer solution carried by the part 12 to form a bond with the inner walls of the hand grip 11, which have been rendered more thermoplastic and receptive to bonding by the application of solvent. The heat also acts to drive the solvent into the material forming the hand grip 11, from which it evaporates away.

The two heating steps described above may be performed at separate times or may follow in immediate sequence. In either event, care must be taken not to apply excessive heat in either stage, which could cause the thermosetting ingredient in the primer solution to become inert to heat and solvent and prevent the formation of a bond between the thermoplastic ingredient and the hand grip.

The temperature ranges set forth above are not absolute limitations, but are preferred ranges within which an acceptable bond is most easily or conveniently formed.

Instead of using a second oven 30, the entire heating operation may be performed in a single two-stage oven in which the first stage performs the initial heating to bond the coating to the handle and the second stage performs the further heating required to render the coating reactive to bonding.

We claim:

1. A method of attaching a thermoplastic hand grip to a fiberglass tool handle, said method comprising the steps of:
    1. applying a substantially low viscosity primer solution to the hand grip receiving part of the handle, said primer solution including a thermoplastic ingredient, a thermosetting ingredient and solvent carrying said ingredients into a compatible solution;
    2. heating said primer-coated handle part to a temperature sufficient to partially, but not completely, cure the thermosetting ingredient of said primer solution to form a secure bond between said thermosetting ingredient and said handle and to render said thermosetting ingredient substantially resistant to thermoplastic solvent, without interfering with the bond forming properties of said thermoplastic ingredient of said primer solution;
    3. applying a thin coating of relatively low viscosity thermoplastic solvent to the interior of the handle receiving part of said thermoplastic hand grip to activate the interior surface of said hand grip;
    4. heating said primer-coated hand grip receiving part of said handle to a substantially high temperature of at least approximately 300°F. to activate the thermoplastic ingredient of said primer without affecting the bond between said thermosetting ingredient and said handle;
    5. inserting said heated part of said handle into said hand grip while said part is heated so that a bond is formed between the heat activated thermoplastic ingredient of said primer carried by said handle and the solvent activated thermoplastic portion of said hand grip without adversely affecting the bond between the thermosetting ingredient of said primer and said handle, whereby said hand grip is effectively bonded to said handle.

2. The method described in claim 1, in which said hand grip is formed of polyvinyl chloride.

3. The method described in claim 2, in which said handle part is first heated to a temperature in the range of about 200° – 250°F.

4. The method described in claim 3, in which said handle part is subsequently heated to a temperature in the range of about 300° – 350°F.

5. The method described in claim 4, in which said handle part is coated with a primer solution which includes as the thermoplastic ingredient heat softenable acrylic resin of the methacrylate series.

6. The method described in claim 5, in which said handle part is coated with a primer solution which includes as the thermosetting ingredient a phenolic resin.

7. The method described in claim 4, in which said hand grip is coated at its bonding surface with a solvent comprising tetrahydrofuran.

8. The method described in claim 7, in which the first of said heating operations is performed in an oven in which a plurality of said handles are removably suspended from a rotatable circular member by individual spring clips.

9. The method described in claim 8, in which the second of said heating operations is performed in a second oven in which only the coated hand grip receiving parts of said handles are inserted for heating.

10. The method described in claim 8, in which said oven is a two-stage oven and both of said heating operations are performed sequentially in said oven.

* * * * *